United States Patent [19]
Stoychoff

[11] 4,264,265
[45] Apr. 28, 1981

[54] ADJUSTING SLIDE MECHANISM FOR TELESCOPING BOOM

[75] Inventor: Terry A. Stoychoff, Schofield, Wis.

[73] Assignee: J. I. Case Company, Racine, Wis.

[21] Appl. No.: 42,513

[22] Filed: May 25, 1979

[51] Int. Cl.[3] ........................ B66F 9/08; F16C 23/02

[52] U.S. Cl. .................................... 414/718; 212/269; 308/3 R

[58] Field of Search ......................... 212/59, 144, 269; 414/718, 786, 680, 694, 696; 308/3 R, 9, 26, 160

[56] References Cited

U.S. PATENT DOCUMENTS

| | | | |
|---|---|---|---|
| 3,015,523 | 1/1962 | Semar | 308/26 X |
| 3,285,431 | 11/1966 | Butcher | 414/718 X |
| 3,499,691 | 3/1970 | Baier | 308/26 X |
| 3,782,793 | 1/1974 | Sinner | 308/160 |
| 3,994,367 | 11/1976 | Christ | 308/9 X |
| 4,045,936 | 9/1977 | Sterner | 308/3 R X |

*Primary Examiner*—David A. Scherbel
*Assistant Examiner*—Jerold M. Forsberg
*Attorney, Agent, or Firm*—Dressler, Goldsmith, Shore, Sutker & Milnamow, Ltd.

[57] ABSTRACT

A telescoping boom has a contact assembly carried on one boom section and has a contact member engaging an adjacent boom section. The contact member is biased toward the adjacent boom section by a spring between the contact member and a piston which is reciprocated in a chamber and defines a sealed compartment. Hydraulic fluid is introduced into the compartment to compensate for wear on the contact member.

2 Claims, 3 Drawing Figures

ADJUSTING SLIDE MECHANISM FOR TELESCOPING BOOM

DESCRIPTION

1. Technical Field

The present invention relates generally to booms and more specifically to multisection booms which are movable relative to each other to increase and decrease the effective length thereof.

2. Background Art

In recent years the use of telescoping booms in various earthworking operations has become a rather customary feature because it increases the overall versatility of the unit. In using telescoping booms, it is necessary to provide some type of limited contact area between the movable boom sections to reduce the friction thereof and increase the life of the basic boom sections.

This is usually accomplished by providing some type of fixed slide mechanism or pad, which is formed from anti-friction material, at selected locations on the boom sections to produce limited contact between the pads and the boom section movable relative thereto. One of the problems with using pads or friction devices is the fact that any wear occurring on the boom or pads will result in additional clearance and therefore reduce the amount of control for the movable boom sections. In order to overcome this problem, it is customary to utilize shims to reposition the contact surface of the pad at appropriate times. However, such a procedure is expensive in that it usually requires the complete disassembly of the boom sections in order to remove the pads for insertion of the shims therein.

Various alternatives have been proposed for substitution for the conventional wear pads and one example is disclosed in U.S. Pat. No. 3,285,431. This patent discloses a plurality of adjustable rollers which can be moved with respect to the supporting boom sections so that the peripheralsurface of the roller can be accurately positioned. This patent also discloses various other types of adjustable contacting mechanisms.

SUMMARY OF THE INVENTION

According to the present invention, a telescoping boom having two relatively movable sections has limited contact means that are essentially self-adjusting and are capable of moving to accommodate irregularities in the boom sections of slight misalignment of the boom sections with respect to each other.

More specifically, each boom section has a plurality of individual contact means for each wall thereof and each contact means includes a housing carried by one section and defining a chamber opening towards the other section with a member reciprocated within the chamber and urging means between the member and the housing to urge a free exposed end of the member into engagement with the other telescoping section.

In the illustrated embodiment, the urging means includes a piston located between the contact member and the base of the chamber which defines a sealed compartment for receiving a fluid. The fluid is preferably an incompressable hydraulic fluid. The urging means also include biasing means between the piston and the contact member to accommodate limited movement of the member in response to irregularities on the surface of the member being contacted.

In the specific embodiment illustrated one end of one telescoping boom section, which is rectangular, has four such contact means or assemblies on each of the four walls thereof while the opposite end of the other telescoping boom section likewise has four such contact assemblies supported on the respective walls.

The method of supporting the telescoping boom section may be summarized as consisting of the steps of producing a chamber on one section that is open toward the other section and inserting a contact member into the open end of thechamber to produce a substantially sealed compartment and introducing a fluid into the compartment to move the free end of the member into engagement with the surface of an adjacent section. The member is preferably in the form of a piston that defines the sealed compartment and supports a contact or sliding member with biasing means between the piston and the sliding member to accommodate limited movement of the sliding member with respect to the piston.

BRIEF DESCRIPTION OF SEVERAL VIEWS OF DRAWINGS

FIG. 1 of the drawings shows a telescoping boom having an earthworking implement supported thereon and the present invention incorporated therein;

Figures 1, 2, 3:
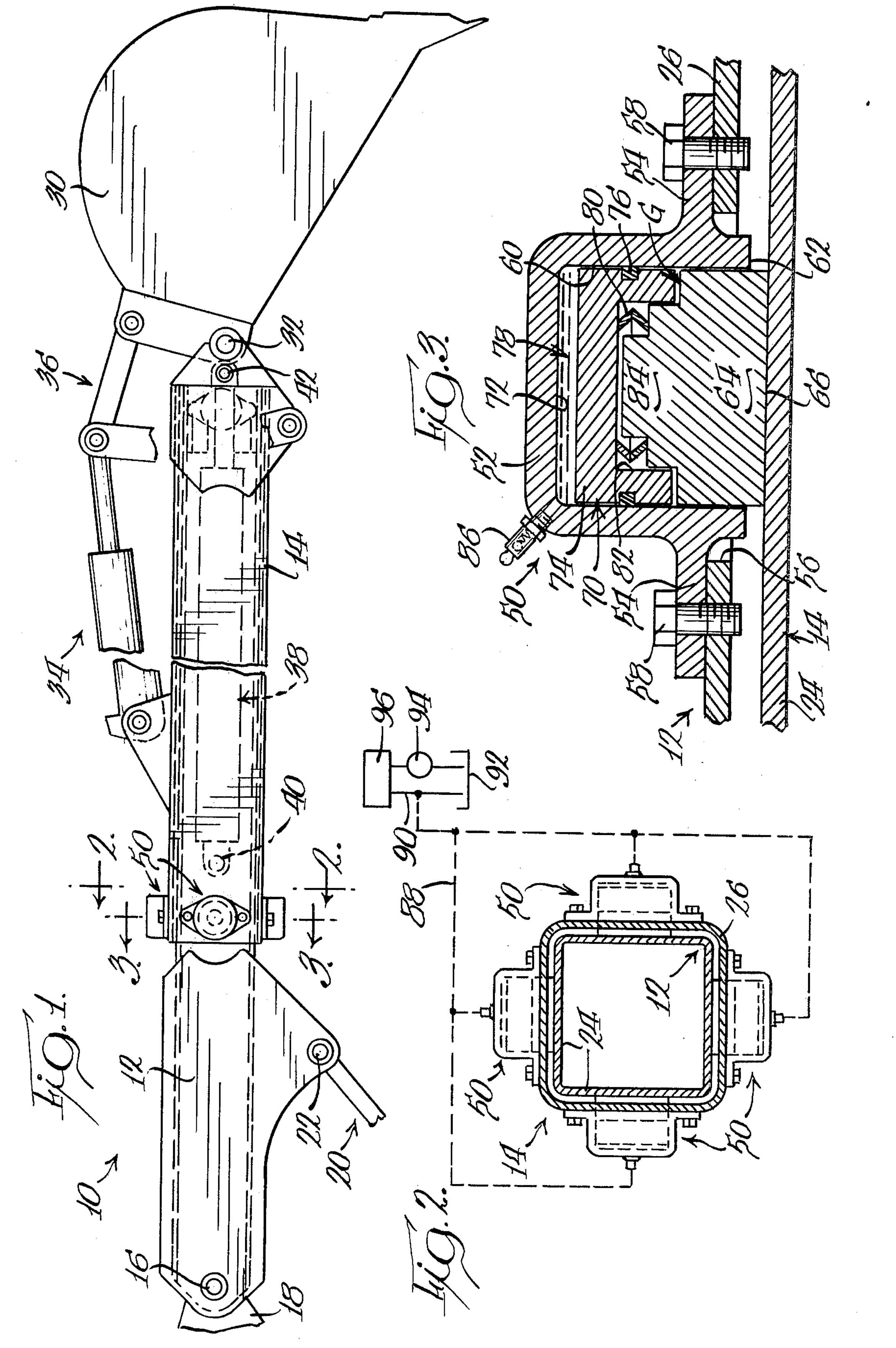
FIG. 2 is a cross-sectional view as viewed generally along line 2—2.
FIG. 3 is an enlarged fragmentary cross-sectional view as viewed along line 3—3 of FIG. 1.

While this invention is susceptible to embodiment in many different forms, there is shown in the drawings and will herein be described in detail an embodiment with the understanding that the present disclosure is to be considered as an exemplification of the principles of the invention and is not intended to limit the invention to the embodiment illustrated.

FIG. 1 of the drawings discloses a telescoping boom, generally designated by reference numeral 10, and including an inner boom section 12 and an outer boom section 14. Inner boom section 12 is pivotably supported by a pin 16 on the end of a support member 18, such as a crane that forms part of a vehicle. The entire boom 10 is normally pivoted about pin 16 through a fluid ram, only a portion of which is shown at 20 in FIG. 1, and which is connected by a pivot pin 22 to the inner boom section 12.

Telescoping boom sections 12 and 14 are preferably rectangular in cross section and each have four walls with the walls of inner boom section 12 being identified as 24 and the walls of the outer boom section being identified as 26. A bucket assembly consisting of a bucket 30 is pivotably supported by a pivot pin 32 on the outer end of the outer telescoping boom section 14 and is pivoted about pin 32 through a fluid ram 34 and a linkage 36. The telescoping boom sections 12 and 14 are preferably extended and retracted with respect to each other through a further fluid ram 38 that has one end connected by a connection 40 to the inner boom section 12 and the opposite end connected by a pivotal connection 42 to the outer boom section 14.

According to the present invention, each of the walls 24 and 26 of the respective boom sections 12 and 14 has a contact assembly 50 associated therewith and contact assemblies 50 are supported on the respective walls of the boom for rapid removal and replacement of the entire assembly. In the preferred embodiment, the outer end of inner boom section 12 has four such assemblies 50 supported on the respective walls 24 while the inner end of outer telescoping boom section 14 likewise has four such assemblies on the respective walls 26.

Since each of the assemblies are identical in construction, only one will be described with particular reference to FIG. 3. Each contact assembly or means 50 includes a housing 52 that is preferably circular in cross-section and has a pair of ears 54 at diametrically spaced locations. Wall 26 of telescoping boom section 14 has an opening 56 for receiving the open end portion of housing 52 and the housing 52 is removably secured to the wall by a pair of bolts 58.

Housing 52 defines a chamber 60 which is open towards the peripheral surface of wall 24 of the adjacent boom section 14 and the open end is identified by reference numeral 62. A contact member 64 is reciprocated within chamber 60 and has a free exposed end or surface 66 that is engageable with an adjacent surface of wall 24 with urging means 70 located between the base 72 of chamber 60 and the adjacent inner end of member 64. In the illustrated embodiment, urging means 70 includes a piston 74 that is slidable within chamber 60 and has an O-ring seal 76 so that a sealed chamber 78 is defined between the base 72 of chamber 60 and the adjacent surface of piston 74. The urging means 70 also includes a biasing means 80 in the form of one or more belleville springs located within a bore 82 defined on the outer end of piston 74 and a reduced portion 84 of sliding contact member 64 which is received into the bore.

Biasing means 80 is selected such that a predetermined biasing force is developed between piston 74 and sliding member 64 to maintain a small gap G between the adjacent surfaces of piston 74 and member 64.

Each of the housing assemblies 52 has a unidirectional valve or check valve 86 leading from the periphery to the sealed compartment 78. According to one aspect of the invention, all of the check valves 86 are connected to a common source 88 which may be the return conduit 90 leading to areservoir 92 which also has a pump 94 leading therefrom for supplying hydraulic fluid to a valve bank 96. The valve bank 96 is operable to supply hydraulic fluid to opposite ends of fluid rams 34 and 38.

Considering now the operation of the overall contact assemblies, the assemblies are preferably initially installed such that the surface of piston 74 is located against the base 72 of housing 52 so that there is virtually no compartment 78. The size and configuration of piston 74, sliding contact member 64 and spring or biasing means 80 is such that there is a small predetermined gap G between the adjacent surfaces of sliding member 64 and piston 74 so that the sliding member, which is preferably formed from a low friction material such as bronze, can reciprocate within chamber 60 to compensate for irregularities in the contact surface of wall 24 and surface 66 of the member 64. As the contact surface 66 begins to wear, the biasing means 80 will continue forcing the surface into contact with the surface of the adjacent boom section. However, at a certain point in time, after considerable wear of the surface 66, compensation is made for such wear by providing an incompressible fluid, such as a hydraulic fluid, behind piston 74 through the unidirectional check valve 86. As indicated above, if desired, such incompressible fluid can automatically be supplied at all times to the respective check valves 86 from reservoir 92 so that the fluid in the sealed compartment 78 is automatically replenished whenever the spring force of biasing means 80 drops below a certain level.

Thus, it will be appreciated that the present invention provides an extremely manner of automatically adjusting the surface of a sliding member and maintaining predetermined force on the member at all times while still accommodating for normal wear of the sliding surface with respect to its adjacent surface. Furthermore, if the components have excessive wear, it is only necessary to remove two bolts 58 and a sliding contact member can be replaced with a new member in a matter of minutes at an extremely low cost.

While a particular embodiment of the invention has been described, certain obvious modifications come to mind. For example, the fluid utilized for the sealed compartment 78 could readily be some other type of fluid and need not be simultaneously supplied to all of the sealed compartments. For example, a conventional grease gun could be utilized to supply an incompressible fluid in the respective sealed compartments whenever desired.

What is claimed is:

1. In a telescopic boom polygonal in cross section having two relatively movable sections with contact means producing sliding contact between said sections, the respective walls of one of said sections having one set of said contact means and the respective walls of the other of said sections having another set of said contact means, at least one contact means carried by each of the walls of each section, each said contact means comprising a housing carried by one of said sections and defining a chamber opening toward the other of said sections, a member reciprocable in said chamber and having a free exposed end engageable with an adjacent surface of said other of said sections and urging means including a piston in said chamber, biasing means located between said piston and said member, means for introducing a fluid into said chamber to urge said piston, biasing means and member as a unit toward said adjacent surface, said housing and piston cooperating to define a substantially sealed compartment with unidirectional valve means connected to said compartment for accommodating flow of fluid to said compartment within said chamber for forcing said free exposed end toward said adjacent surface.

2. In a polygonal boom having two telescopic boom sections each having a plurality of walls with contact means between each pair of adjacent walls of the respective boom sections, each of said contact means including a housing attached to one of said pair of adjacent walls defining a chamber open toward the other of said pair of adjacent walls, each wall of one boom section supports a contact means at one end thereof and each wall of the other boom section supports a contact means at an opposite end thereof, engaging means including a piston reciprocable within said chamber and a member having an exposed end adapted to engage a surface of the other of said pair of adjacent walls, biasing means between said piston and member biasing said member toward said surface, said housing and piston cooperating to define a substantially sealed compartment, and means for introducing a fluid into said compartment to move said exposed end toward said surface.

* * * * *